United States Patent [19]

Ozin et al.

[11] 4,292,253
[45] Sep. 29, 1981

[54] ORGANO-METAL CATALYSTS AND PROCESSES FOR THEIR PREPARATION

[76] Inventors: Geoffrey A. Ozin; Colin G. Francis, both of 63 Gormley Ave., Toronto, Ontario; Helmut X. Huber, Apt. 1105, 627 W. Mall, Etobicoke, Ontario, all of Canada, M4V 1Y9

[21] Appl. No.: 27,572

[22] Filed: Apr. 3, 1979

[51] Int. Cl.³ .................................................. C07F 7/28
[52] U.S. Cl. ........................ 260/429.5; 260/429 AR; 260/438.5 R
[58] Field of Search .................. 260/429 CY, 429 AR

[56] References Cited

U.S. PATENT DOCUMENTS 3,906,017  9/1975  Middleton et al. ........... 260/438.5 R
3,998,864  12/1976  Trevillyan ...................... 260/439 R
4,080,490  3/1978  Dawans et al. .............. 260/439 R X

OTHER PUBLICATIONS

Francis et al., J.C.S. Chem. Comm., pp. 466–467 (1977).
Pittman et al., J.A.C.S. 97(7), pp. 1742–1748 (1975).
Skell et al., J.A.C.S. 95(10), pp. 3337–3340 (1973).
Boyd et al., The J. of Chemical Physics 60(10), pp. 4088–4089 (1974).

*Primary Examiner*—Helen M. S. Sneed
*Attorney, Agent, or Firm*—Hirons, Rogers & Scott

[57] ABSTRACT

Metal catalysts for use in known heterogeneous catalysis processes are prepared by vaporizing a metal in a low pressure environment in the vicinity of an organic liquid polymer, so that the metal contacts and becomes anchored to the polymer. The resulting products have the metal in the form of small clusters, anchored to the polymer, this form of the metal being the catalytically most active form. The organometal polymers are stable at temperatures in the $-40°$ C.$\rightarrow +40°$ C. range. Suitable polymers include poly (methyl-phenyl siloxanes) and poly (phenyl ethers). Suitable metals include titanium, chromium, molybdenum, etcetera.

16 Claims, 7 Drawing Figures

ORGANO-METAL CATALYSTS AND PROCESSES FOR THEIR PREPARATION

FIELD OF THE INVENTION

This invention relates to compositions of matter useful as catalysts, and processes for their preparation. More particularly, it relates to organo-metallic polymeric materials having catalytic activity, their preparation and use as catalysts.

BACKGROUND OF THE INVENTION

Very many chemical reactions of industrial importance, especially in the petroleum refining and petrochemical industry, involve the use of heterogeneous catalysis. Commonly, the catalysts used are heavy metals or transition metals such as chromium, molybdenum, tungsten, iron, titanium, vanadium, copper, cobalt, nickel, zirconium, niobium, tantalum and the like, or compounds thereof, and mixtures of one or more of these metals or compounds with other metals or compounds. Examples of such processes which depend on heterogeneous catalysis include selective oxidation of hydrocarbons, metathesis of olefins, isomerization of olefins, isomerization of alkanes, ring hydrogenation, olefin oligomerization, alkane and alkene dehydrogenation and the like.

The nature of the catalytic reaction and the chemical mechanism by means of which the heterogeneous catalytic material participates in and/or promotes the reaction has been the subject of intensive research studies in recent years. It has been accepted for many years that heterogeneous catalysis is a surface phenomenon, with the exposed surface of the catalyst apparently possessing active catalytic sites. Thus, the more finally divided a particulate heterogeneous catalyst, normally the higher its catalytic activity. More recently, it has been determined that the most catalytically active form of a metal in a supported or unsupported heterogeneous catalyst, in at least 95% of cases, is a small-cluster form of the metal with up to about 15 metal atoms formed into a "cluster". This is perhaps the ultimate extension of fine subdivision of the heterogeneous catalyst.

The properties of the metal when in the form of small clusters of a few atoms only, are different from those of the metal when in stable, bulk form. This is believed due at least in part to the fact that metal atoms in small clusters are separated from other atoms of the metal to a sufficient extent that the interaction effects therewith are neglible. In bulk metal, in contrast, each individual atom of the metal is in fixed spatial relationship and close proximity to very large numbers of other, similar atoms of the same metal, and the resulting interactions have profound effects on the properties of the bulk metal.

Small cluster forms of metal are, however, extremely short lived and unstable under normal conditions. Whilst metals may be generated in uni-atomic condition, especially in the vapour phase by suitable evaporation, the atoms will very rapidly agglomerate together, firstly into small clusters but then growing into bulk material. The prevention of this agglomeration, to produce metal in small cluster form, poses problems. It is particularly difficult to produce small-cluster form of metal which is stable at or close to room temperatures.

DESCRIPTION OF THE PRIOR ART

Previous attempts to obtain heavy metals in uni-atomic and small cluster form have largely centered around low temperature studies, with the objective of slowing down the rate of bulk metal growth, after generation thereof in uni-atomic form, by "cryochemical trapping." In such techniques, the metal atoms are generated and passed into a cryogenic diluent, e.g. solid argon at 10° K. with the result that they grow very slowly. At these temperatures, the nucleation of the atoms into clusters, and the growth or nucleation of the clusters into bulk metal, is controlled. However, the metal in this form is generally stable only at very low temperatures. When the temperature increases, even to temperatures above about 40° K., the small-cluster form is lost and bulk metal forms by agglomeration so that the technique is impractical for industrial application.

When transistion metals are vapourized, e.g. by resistive heating, they are initially vapourized in the uni-atomic condition. Very rapidly indeed, under normal conditions, the single atoms agglomerate in small clusters, and then very rapidly bulk metal is formed by agglomeration of the clusters. Work has been done and reported recently in which metal was vapourized at low pressures and reacted with liquid aromatic polymers to produce bis-arene complexes of the metal with the polymer, the metal existing in single atom form associated with the arene group on the polymer chain (Francis and Timms, Journal of the Chemical Society, Chemical Communications, 466, 1977). However, no metal in stable, small cluster form, usable as a catalytic material in industrial processes, is reported therein.

The study of the role of metal clusters in heterogeneous catalysis has been hampered by the lack of a chemical technieque by means of which small clusters of known, controlled sizes can be produced and tested. For example, it is believed that clusters of size 2–6 atoms are generally the most catalytically active. However, in the absence of a technique for generating such clusters, of known, controlled size, and in relatively stable form, testing and further study thereof is hampered.

SUMMARY OF THE INVENTION

It is an object of the present invention to provide novel compositions of matter incorporating metals in a condition exhibiting high catalytic activity.

It is a further object to provide a process for preparing such compositions of matter.

It is a further object to provide a process for producing compositions of matter containing small clusters of metal atoms of known, controlled sizes in the 2–13 atom range, said clusters including one or more metals.

It is a further object to provide catalysis processes using as catalysts compositions of matter containing metals in small-cluster form.

We have found that metals commonly used as heterogeneous catalysts can be reacted, in their uni-atomic or small-cluster form, with liquid organic polymers, to produce novel organo-metallic polymers in which the metal is retained in its small-cluster form. Moreover, these novel organo-metallic polymers according to the invention are reasonably stable at temperatures in the $-40°$ C.$-+40°$ C. range, and the form of the metal attached to the polymer is retained at such temperatures. They can be produced by processes operated within such a temperature range.

According to the present invention, there is provided, in one aspect, a process for preparing organo-metal compounds having at least one metal in small-cluster form bonded to a liquid polymeric organic material, which comprises vapourizing the metal into uni-atomic or small-cluster form in an environment of low pressure containing said liquid polymeric organic material, causing the vapourized metal to contact and react with reactive sites on said liquid organic polymeric material prior to agglomeration of the metal atoms into bulk metal form, so as to deposit said at least one metal onto the organic polymer in small-cluster form, and effectively anchor said at least one metal to the organic polymer in small-cluster form, and recovering the organo-metallic polymeric material so formed from said low pressure environment.

From another aspect, the present invention provides novel organo-metallic liquid polymeric materials, comprising at least one metal selected from the group consisting of titanium, zirconium, vanadium, niobium, tantalum, molybdenum, chromium, iron, cobalt, nickel, rhodium, palladium, platinum tungsten, aluminum and silver chemically bonded to a liquid organic polymer at random positions along the polymeric backbone chain thereof, substantial quantities of said metal being present in the liquid organo-metallic polymeric material in small-cluster form.

BRIEF REFERENCE TO THE DRAWINGS

The accompanying drawings are spectrographic plots of ultraviolet-visible spectra of various products made according to the present invention.

DESCRIPTION OF THE PREFERRED EMBODIMENTS

Figures 1, 2:
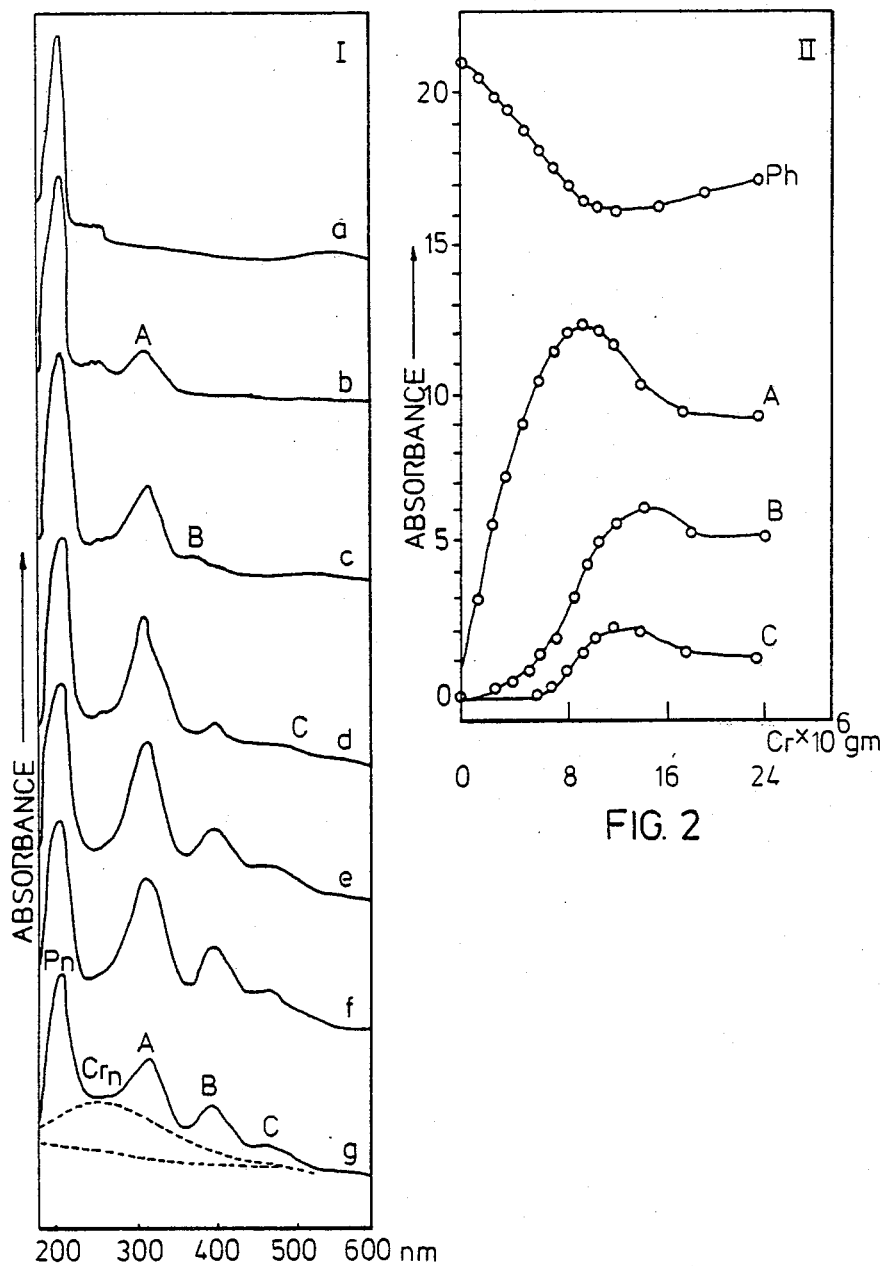

References herein to the polymers being "chemically bonded" to the metal are intended to indicate that there is a form of chemical association between the clustered metal atoms and the polymer which has the result of anchoring the metal atoms with respect to the polymer and hence with respect to each other, thereby effectively preventing metal agglomeration. The precise nature of the bonding which occurs is not known in detail and has not been categorized. It may perhaps be more properly referred to as solvation.

Polymers useful in the present invention are liquid organic polymers which contain functional groups thereon at appropriate locations, to bond with metal being vapourized, rapidly and relatively firmly, under the preparation conditions. The use of polymers in the liquid phase is significant, since this allows for adequately fast surface penetration of the metal atoms into the body of the liquid polymeric material, and diffusion therein at or close to ambient temperatures. In this way, large numbers of metal reception sites in the polymer, i.e. functional groups therefor, can be utilized.

It is preferred according to the invention to use liquid polymers having aromatic functional groups attached directly or indirectly to the polymer backbone, for example aryl groups, naphthyl groups, phenanthryl groups, pyridinyl groups and the like. Also preferred are polymers containing olefinic unsaturation, e.g. containing vinyl and vinylidene groups as well as internal olefinic unsaturation in the backbone of the polymer. Polymers containing ring-unsaturation functional groups are also useful, e.g. polymers containing cyclopentadienyl groups, cyclohexadienyl groups, cycloheptadienyl groups, cyclooctadienyl groups and the like, and the polymers containing bridged-ring unsaturated diolefinic groups such as dicyclopentadienyl groups, norbornadienyl groups and the like. For use with certain selected materials, e.g. silver, polymers with chlorine and bromine functional groups may also be useful.

The polymers may be hydrocarbon polymers, or alternatively may be silicone polymers. They may contain other functional groups, hydrocarbon or non-hydrocarbon, in addition to those which participate in the chemical bonding of the metal atom clusters. They may be homopolymers or copolymers of two or more monomers, to provide the necessary functional groups therein. Their structures and molecular weights should be such that they are viscous liquids at some points within the $-40°$ C.$-+40°$ C. range.

Examples of suitable polymers include poly(methylphenylsiloxanes), poly-(phenylethers), aromatic ester polymers, polymers and copolymers of styrene, polymers and copolymers of substituted styrenes such as o-chloro-styrene or alphamethylstyrene, polymers and copolymers of vinylnaphthalene, polyvinyl pyridines, copolymers of monoolefins such as ethylene and/or propylene with the aforementioned bridged-ring diolefins, polymers and copolymers of conjugated diolefins such as butadiene and isoprene which contain residual unsaturation, and the like.

It is also preferred that the polymers chosen should have low vapour pressures. In the process of the invention, the metal must be vapourized and moved to the polymer without undergoing agglomeration beyond the small-cluster size. Hence, the fewer polymer or other molecules present in the gas phase environment of the metal vapour and polymer, to cause collisions of metal atoms, the better.

Particularly suitable polymers for use in the present invention are liquid poly(methylphenylsiloxanes) which have the general structural unit

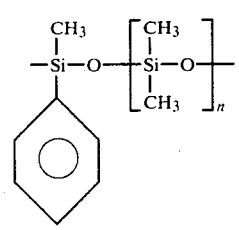

I where n is an integer from about 1 to 10. Upon reaction with a heavy metal M selected from those contemplated in the present invention, in vapourized form, the metal is believed to form a bis-arene ligand-type compound, involving a small cluster of metal atoms, between aryl groups of the two polymeric chains, thus:

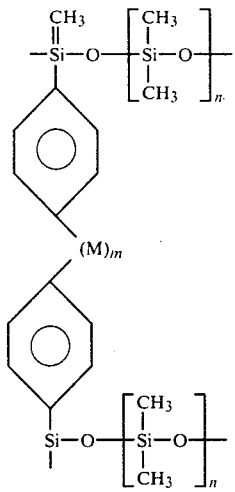

where m is an integer from about 2 to 15.

It is however possible that the main-chain oxygen atoms of the polymer have a role in the ability of the polymer to sustain and stabilise small-clusters of metal atoms at or close to room temperature. Thus, polymers containing oxygen linkages may be preferred especially.

A specific commercially available example of a polymer meeting the above formula is DOW CORNING liquid DC510, a liquid poly(methylphenylsiloxane) containing a methyl:phenyl ration of 17:1.

A specific commercially available suitable poly(phenyl ether) is SANTOVAC 5, which has particularly low vapour pressure.

The preferred processes by which the materials are made according to the present invention include vapourization of the metal in an evacuated chamber, in the proximity of the liquid polymer. Suitably, on a macroscale, the metal may be located at the centre of a rotating, evacuated vessel which rotates about the metal. Liquid polymer is disposed as a thin film on the walls of the vessel as it rotates around the metal. When the metal is heated to vapourize it, the metal atoms leave the bulk source in uni-atomic form and impinge upon the liquid polymer to become bound thereto in small-cluster form. The rotation of the polymer around the source ensures substantially even metal-atom contact with the entire quantity of polymer. Vapourization of the metal can be caused by a variety of known methods, such as resistive heating, electron beam impingement and the like, to cause localized heating only of the bulk metal. Suitably, the metal is contained in an electrically heated crucible, located at the centre of the rotating evacuated flask. Apparatus suitable for conducting the process as described above is available commercially from G. V. Planer Ltd., Sunbury-on-Thames, England, under the designation "Vapour Synthesis Equipment type VSP101", or "type VSP302".

The gas pressures within the vessel in which the metal vapourization and reaction thereof with liquid polymer take place should be sufficiently low to ensure that the metal vapour reaches the polymer, to a large extent, in its uni-atomic or small-cluster form. Extraneous gas molecules with which the metal vapout atoms can collide thus need to be reduced. Suitable metal vaporization pressures are in the approximate range $10^{-3}-10^{-7}$ torr (1 torr = 1 mm of mercury).

By means of the process of the present invention, there are obtained organo-metallic liquid polymers which are reasonably stable at temperatures in range $-40°-+40°$ C. The stability will of course vary depending upon the particular choice of metal and polymer combination. The organo-metallic liquid polymer can be produced at temperature chosen within the range at which the product is stable, and recovered, stored and used at such temperatures.

The products of the invention show remarkable stability at or about room temperature, in contrast to any previously produced small-clusters of metal atoms. After their production as described, they can be stored for extensive periods of time in inert atmospheres, e.g. at ambient pressures under argon or the like, and at close to room temperatures. Thus, in practice, the flask containing the organo-metallic polymer produced as described is pressurized with inert gas, and may be transferred and handled by known vacuum techniques for the handling of reactive materials, such as a Schenk line.

For the preparation of catalysts, the organo-metallic polymer so produced may be mixed with known inert supports such as metal oxides, e.g. alumina or silica, of known type. Since they are highly reactive materials, and hence have accordingly high catalytic activity, they should be maintained under inert atmosphere during preparations, until they are ready for use. It may be advantageous in some cases to disperse finely divided catalyst support material in the liquid polymer before the metal is vapourized and anchored thereon, so that a ready supported catalyst is formed. The catalyst can then be used as a fixed bed catalyst, and reactive gases flowed over the catalyst in the catalytic process.

Alternatively, the material so formed can be used in unsupported form, e.g. as an oil, in the form in which it is produced. It may then be used in a fluid bed reactor, for catalysis processes.

An alternative process for producing the materials of the invention, particularly useful for spectroscopic analysis and tracking of the process and product, utilizes a matrix isolation apparatus which is basically an extension of the oil matrix method and apparatus described by Sheets & Blyholder, "Applied Spectroscopy", Volume 30, 602 (1976) and references cited therein. In a typical experiment, a thin ($10^{-6m}$) film of liquid polymer, e.g. DC510, is painted onto an optical window of quartz or sodium chloride in the apparatus, and the reaction chamber is evacuated to a pressure suitable for the generation of metal vapours. The window is cooled to $-20°$ C., and metal vapour, e.g. chromium is generated within the reaction chamber of the apparatus by electrical resistive heating of bulk metal disposed therein. The amount of metal vaporized and reacted with the liquid polymer is monitored by use of a suitably positioned and calibrated quartz crystal micro-balance, resolution $10^{-9}$gm (nanogram resolution). Chromium vapour is deposited into the fluid polymer at the rate of 0.3 micromols per hour, to give a gold coloured matrix. The ultraviolet-visible spectrum of the matrix is read at different metal:polymer ratios, i.e. at different deposition quantities. Bands appear in these spectra indicating the presence of small clusters of metal atoms. The position of the bands is characteristic of the cluster size. It is found that the initial deposition creates metal atoms in single atom form, followed by deposition in clusters of two, deposited on the polymer. As deposition continues, the quantity of metal in 2-atom clusters reaches a maximum and then decreases in favour of larger clusters. By these means, the process can be controlled to give polymer-cluster metal complexes in which the cluster size is predetermined, depending upon the amount of deposited metal. Further control over the metal cluster sizes is provided by the specific choice of polymer and its viscosity, and reaction temperature, besides the degree of metal loading and rate of metal deposition. The findings are readily adaptable to the larger scale productions using rotary deposition, as previously described, to produce larger quantities of organo-metal polymers of known cluster sizes, controlled by the amount of metal allowed to deposit thereon.

According to another important feature of the present invention, a plurality of different metals can be deposited onto a single polymer, in small-cluster form. This can be done either by vaporizing in the presence of the polymer a mixture of two or more metals, by the procedures described above, or alternatively by the successive deposition of different metals onto the polymer. Thus, for example, a polymer containing both chromium and titanium, or containing both molybdenum and titanium, can be produced, giving a material which is useful in a variety of different catalytic applications. In effect, a small alloy cluster of metal atoms is formed, linked to the polymeric substrate in small cluster form.

The invention will be further described with reference to specific examples.

EXAMPLES

In each of the following examples, there was used the experimental technique referred to above and basically described as the oil matrix method, developed by Sheets & Blyholder to produce large metal particles suspended in an inert paraffin oil. In the present examples, the method is modified so that a thin film (approximately $10^{-6}$m) of a polymeric fluid, containing reactive functional groups, is applied to a circular quartz optical plate of diameter 1 cm, cooled to 240°–270° K. by means of an Air Products Displex refrigeration system. An evaporation source, equipped with a quartz crystal microbalance for continuous measurement of the metal deposition rate, is used to deposit metal vapour into the liquid film, typically at a rate of approximately 0.2 millimols per hour.

By means of ultraviolet-visible spectroscopy, the formation of products under various experimental conditions such as metal deposition rate, metal loading, functional group loading and reaction temperature, may be quantitively monitored.

EXAMPLE 1

A film of thickness $10^{-6}$m of DC510 liquid polymethylphenylsiloxane was applied to the quartz optical window, and chromium metal was vaporized in the evacuation chamber by resistive heating. The pressure in the evacuation chamber was approximately $10^{-6}$torr. The temperature of the polymer film on the optical window was $-20°$ C. The rate of deposition of chromium metal vapour onto the polymer film, as determined by the previously calibrated quartz crystal microbalance, was about 0.2 millimols per hour.

The polymer-metal product formed on the optical window was continuously monitored by visible-ultraviolet spectroscopy. FIG. 1 shows a series of spectroscopic plots, absorbence against wave length, of the product of the experiment, taken at different metal deposition increments of about 10 mcg. Curve a has no metal loading. The figure shows the appearance of an intense absorption peak A at about 318 nm, with a corresponding small decrease in the absorbence at about 214 nm due to free phenyl substituents on the polysiloxane, provided that the total metal loading remains low. The spectrum also shows significantly the absence of broad optical absorptions (in the 200–400 nm region) associated with bulk electronic excitation of chromium particles with colloidal dimensions. It is clear from comparison of this spectrum with that available in the literature pertaining to complex $(C_6H_6)_2Cr$ that the initial species generated on the optical window is polymer attached bis($\pi$-arene) chromium (0). As the chromium loading increases, through curves b, c, d, e, f and g maintaining the same deposition rates, the spectra show a rise in bis-(arene) chromium species and a parallel diminution of the uncomplexed phenyl (214 nm). A new absorption B at 402 nm with distinct growth behaviour appears at metal loadings greater than $2 \times 10^{-6}$g. As the deposition progresses to the extent of metal loading greater than $6 \times 10^{-6}$g, a third species absorbing at 497 nm (species-peak C) can be seen to grow in.

The overall growth-decay characteristics of species giving rise to peaks A, B, C and uncomplexed phenyl are plotted as a function of metal loading, in FIG. 2. It can be seen that species A reaches its maximum concentration around a metal loading of $9.6 \times 10^{-6}$g, at which point the phenyl absorption essentially levels out at its minimum value. The continued growth of species B and C, both reaching their maximum concentration at a metal loading of $13.5$–$14.4 \times 10^{-6}$g, occurs without further consumption of polymer attached phenyl groups. Cluster species B and C are thus being formed from single atom species A. It is also significant to observe that all of the species A, B and C decay at metal loadings in excess of $14.5 \times 10^{-6}$g, with total saturation of the system displayed clearly at loadings of $18.0 \times 10^{-6}$g, represented by curve g of FIG. 1, by the gradual appearance of broad background resonances associated with bulk chromium particles of colloidal dimensions.

All of the analytical evidence shows that species B and C are polymer-stabilized chromium clusters, which may be considered as being "solvated" by phenyl groups in an essentially bis($\pi$-arene) metal fashion. Metal concentration studies in the model system $C_6H_6$-Ar at 10°–12° K. indicate that the polymer-anchored species are binuclear and trinuclear in chromium.

Preliminary kinetic analysis of the growth-decay behaviour of the species in this system indicates a sequential formation of Cr, $Cr_2$ and $Cr_3$ stabilized by interaction with two phenyl groups on the polymer. These polymer-stabilized cluster species appear to be indefinitely stable at $-20°$ C., but, on warming to room temperature, thermal dissociation seems to occur, releasing the supported $Cr_2$ and $Cr_3$ clusters and allowing further aggregation to higher nuclearity bulk-like clusters.

The process can be considered as a quantitative "metal atom titration" of phenyl groups in the DC510 polymer. As the chromium cluster develops between the solvating or stabilizing arene rings, the metal-arene interactions diminish in strength until, at n greater than 3, the rings are released from the cluster allowing further aggregation of chromium to a size at which broad background optical absorptions characteristic of colloidal chromium become apparent.

EXAMPLE 2

Figure 3:
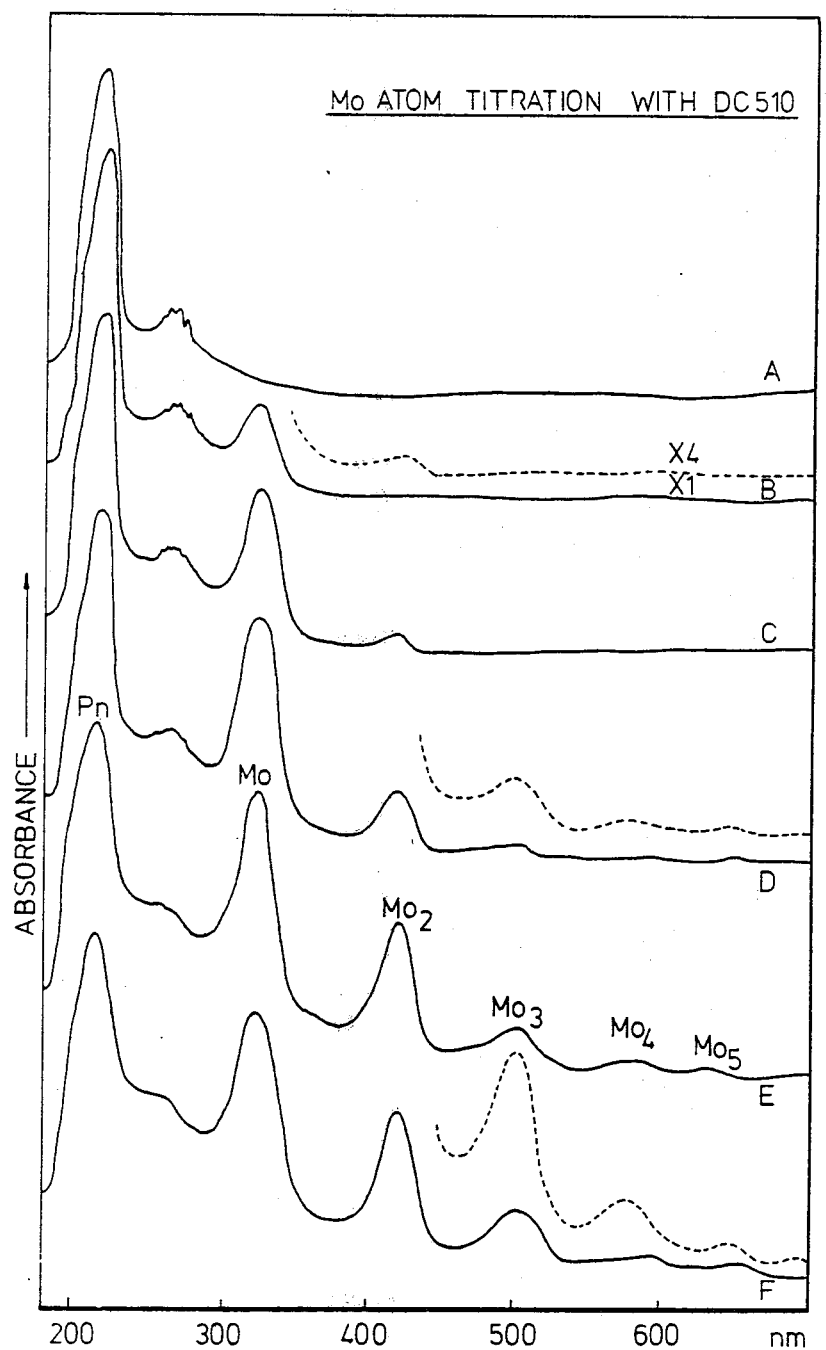
Figure 4:
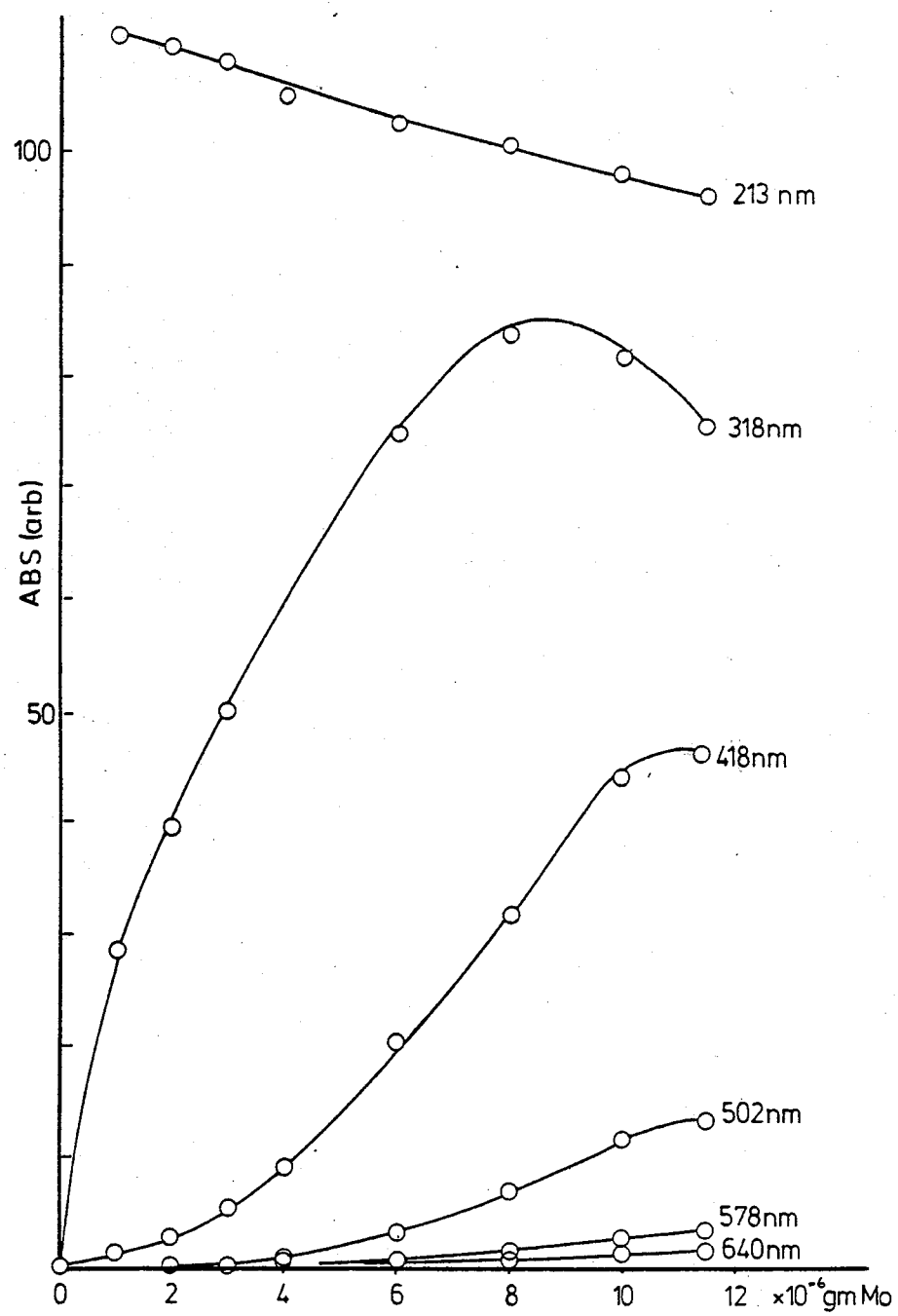

The above experimental procedure was essentially repeated, in this instance using molybdenum as the metal. The temperature of the optical window was 250° K. The visible-ultraviolet spectra obtained from the molybdenum product is shown in FIG. 3, presented on the same basis as FIG. 1 previously discussed. The curves A, B, C, D, E and F are obtained at different loadings of molybdenum metal onto the polymer DC510, at increments of 1-2mcg. Curve A represents no metal loading, and evidences the strong absorption at about 214 nm due to the phenyl groups of the polymer, largely in accordance wih curve a of FIG. 1. At low metal loadings, curve B, an absorbence appears at 318 nm, assignable to a polymer-anchored bis(arene) molybdenum species containing a single metal atom. On increasing the metal loading to roughly $10^{-4}$ mol a new band at 418 nm begins to emerge, as shown on curve C, and as the concentration of molybdenum is progressively increased, further bands at 502, 578 and 640 nm become apparent, as shown in curves D, E and F. The broken lines adjacent to curves B, D and F are magnification of these curves, four times magnified. The variation of absorbence for each band as a function of metal loading is depicted in FIG. 4, and confirms that each band represents a separate species as shown by their independent growth characteristics.

The bands in this visible region of the spectrum are attributable to metal-localized excitations in small molybdenum clusters, with nuclearity in the range n=2-5.

The polymer stabilized molybdenum cluster species are firmly stable below 300° K.

EXAMPLE 3

In this experiment, a bimetallic system was produced using the metals titanium and molybdenum. The polysiloxane polymer DC510 was used as the liquid matrix. Initially, titanium vapour was deposited into the liquid polymer matrix, at the approximate rate of 0.25 millimols per hour. Molybdenum vapour is then deposited at a similar rate, following the same procedures as previously described, and determining the course of absorption and reaction spectroscopically as discussed. In this arrangement for bimetallic deposition, an apparatus is used having two pairs of electrodes, one containing each of the metals to be vapourized, and containing a shield between the two metals. Then, the first metal can be resistively heated in the evacuated chamber for the desired period of time to cause vaporization thereof, and then vaporization of that metal can cease and the second metal can be vaporized, to the required extent, without disturbing the reaction conditions siuch as pressure, etc. within the evacuated chamber, and without causing interaction of the two metals themselves in the absence of the polymer. Alternatively, the two metals can be vaporized simultaneously.

Figure 5:
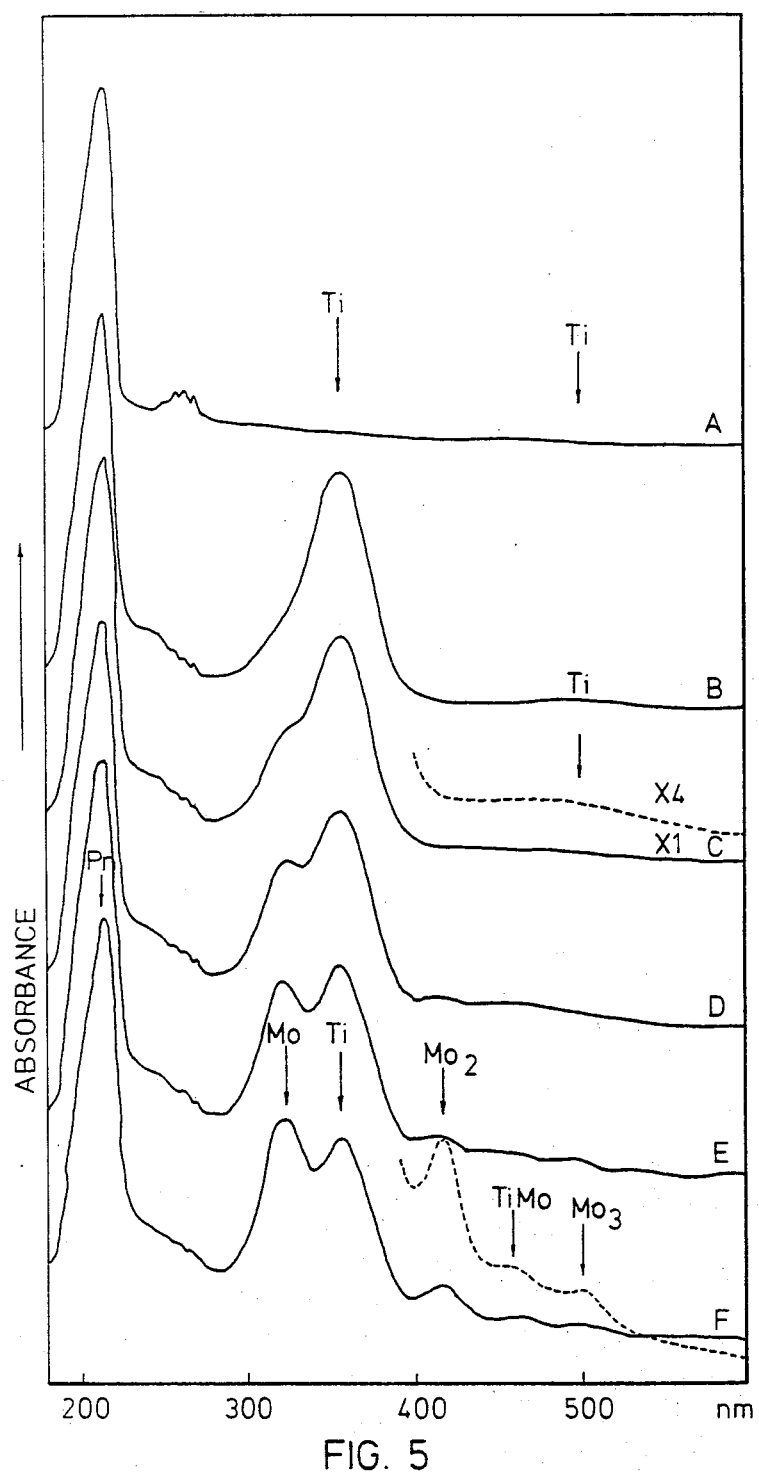

The results are shown in FIG. 5, a plot of absorbence against wave-lengths. Curve A is the spectrum from the polymer with no metal loading. Initially, as titanium vapour is deposited into the liquid matrix, at the rate of approximately 0.25 millimols per hour, formation of supported bis(arene) titanium is observed, as shown by the appearance of absorption at 355 nm, curves B and C of FIG. 5 especially. As deposition progresses, the concentration of (arene)$_2$-titantium increases until all of the phenyl groups suitable for coordination to metal to give a bis(arene) species are complexed. Molybdenum vapour is then deposited at a similar rate, and band at 321 nm, curve C, due to supported bis(arene) molybdenum, starts to apear. On increasing the molybdenum loading to approximately 1 millimol, 3 bands begin to grow, at 418 nm, attributable to Mo$_2$, 503 nm attributable to Mo$_3$, and 460 nm. The last band is not present in either of the individual spectra, and so must be associated with a polymer stabilized TiMo cluster species, i.e. a "alloy" cluster species. The 355 nm band due to (arene)$_2$Ti tends to decrease as the other species are growing.

This experiment shows that it is possible to stabilize small polymetallic clusters at room temperature by means of a fluid polymer matrix.

EXAMPLE 4

In this example, using the same experimental technique and process as in Example 3, a bimetallic titanium-chromium system was prepared. The liquid polymer DC510 was applied to the optical window at a film thickness of $10^{-6}$m, and metal vapours were deposited into the liquid film at a rate of approximately 0.2 millimols per hour. The process took place sequentially, first with the deposition of titanium vapour onto the polymer film and then with the deposition of chromium vapour onto the polymer film.

Figure 6:
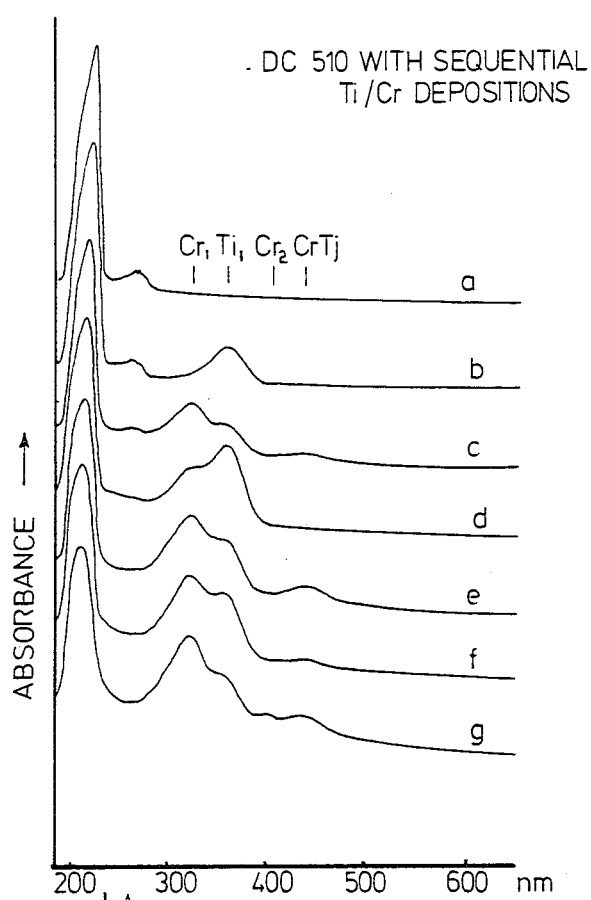

The results of this bimetallic experiment are illustrated in FIG. 6, spectrographic plots in the same form as previously described. As a small amount of titanium vapour is deposited in the fluid polymer, one observes the expected 357 nm band of polymer-supported bis(arene) titanium. Depositing a small amount of chromium vapour, one observes the growth of the 318 nm absorption of the bis(arene) chromium, but also a depletion of the bis(arene)-titanium and the growth of a new species, labelled CrTi absorbing at 442. That this is a chromium-titanium species is deduced from the observation that the new species absorbs in a region between the proposed polymer attached dichromium (402 nm) and dititanium (560-610 nm) cluster species. This is in keeping with the average environment effect for metal-localized excitation of similar origin observed in hetero-binuclear cluster carbonyl complexes.

On depositing more titanium vapour in the film, curve d of FIG. 6, the polymer-supported bis(arene)-titanium species increases, the bis(arene) chromium band does not change, and that due to the chromium-titanium species decays appreciably.

Figure 7:
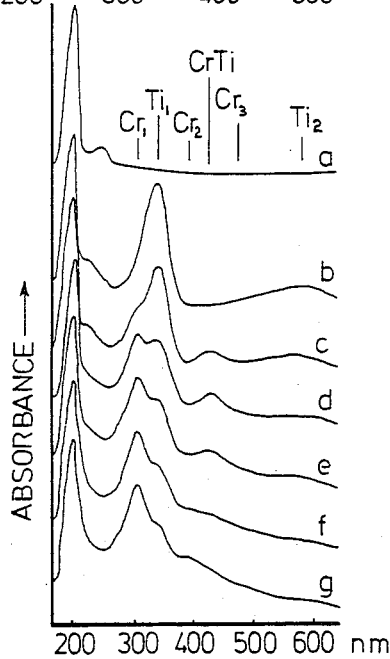

In FIG. 7, there are illustrated the results of metal atom saturation experiments. The gradual deposition of titanium atom into polymer DC510, up to the saturation loading, leads to both polymer-supported bis(arene) titanium and polymer stablized two or three atom titanium clusters-see spectrum b of FIG. 7. On depositing chromium vapour into this titanium-saturated DC510 fluid, one observes the decrease of bis(arene) titanium and the cluster species with concurrent growth of bis(arene) chromium and the chromium-titanium species, spectra c and d. When more chromium vapours deposited into the fluid, the bis(arene) chromium species increases whilst the CrTi species increases and then decays. This is accompanied by depletion of the titanium cluster species but eventual formation of the polymer-stabilized dichromium species, spectra d, e, f and g. There is continued consumption of polymer-supported phenyl groups beyond the titanium saturation loading during the deposition of chromium atoms.

The bimetal titanium-chromium depositions at low metal loadings are leading to polymer-supported bis(arene) metal complexes with two different mononuclear metal sites attached to the same polymer. At high metal loadings, binuclear sites containing polymer stabilized $Ti_2$, $Cr_2$ as well as Ti-Cr clusters are formed.

Figure 8:
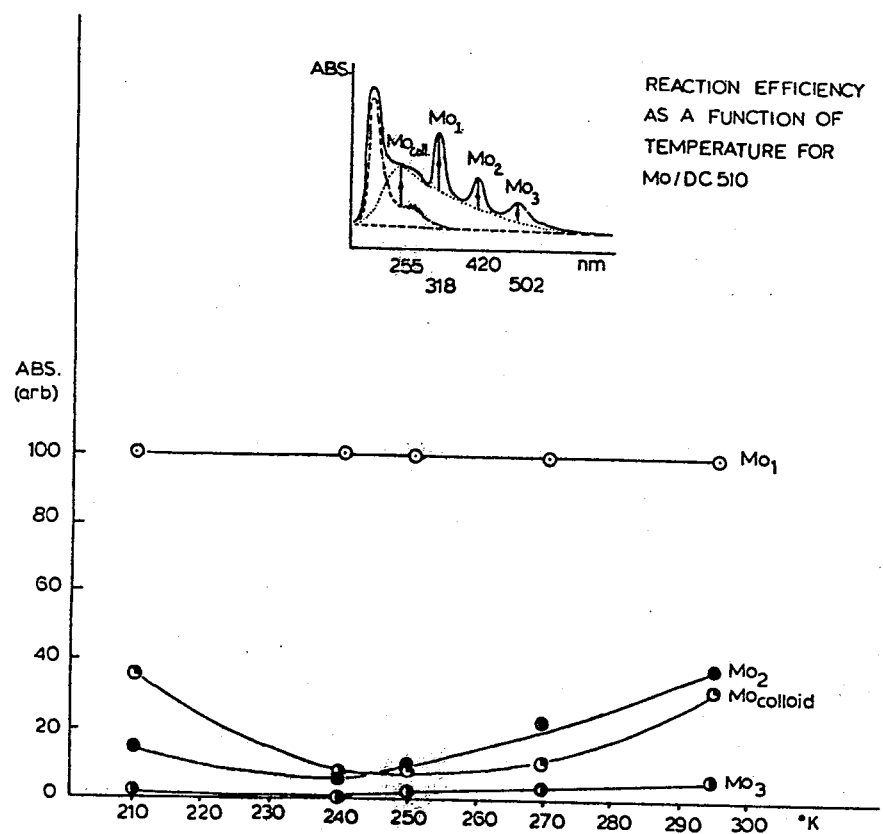

FIG. 8 shows a plot of product distribution in the Mo/DC510 reaction as a function of the temperature of deposition. It can be seen that formation of the bis(arene) molybdenum species is favoured in the range of 240–250K, while formation of higher nuclearity species becomes more important at both higher and lower temperatures in the region 210–300K. The origin of the Mo colloid absorption, however, appears to be different in the 210K and 300K extremes; namely, rapid metal aggregation in the surface layers of the film at the lower temperature and colloidal metal formation within the film at the higher temperature. Cluster sizes in the product thus have temperature dependence.

The above specific examples show that it is possible by means of the present invention to prepare polymer-metal combinations in which clusters of metals are formed in controlled manner. Parallel experiments conducted on the macro scale, using the rotating flask technique containing the polymer on the walls of the flask, rotating about the vaporizing metal under vacuum, have indicated that the results correlate well on the macro scale, and that polymer can be produced on larger scale with controlled metal clusters thereon.

We claim:

1. An organometallic liquid polymeric material comprising: an organic polymer which is a viscous liquid at a temperature in the range of −40° C. to +40° C. and is selected from the group consisting of polymers having carbon-carbon polymeric chains and silicone polymers, said polymer having functional groups therein and selected from aryl groups, naphthyl groups, phenanthryl groups, pyridinyl groups, olefinic unsaturation, cyclopentadienyl groups, cyclohexadienyl groups, cyclooctadienyl groups, dicyclopentadienyl groups and norbornadienyl groups;

and at least one metal chemically bonded to said polymer, in substantial quantities, in the form of small stable clusters of 2–13 metal atoms, said at least one metal being selected from the group consisting of titanium, zirconium, vanadium, niobium, tantalum, molybdenum, chromium, rhodium, palladium, platinum, tungsten, aluminum and silver;

said material and said small-cluster metal form therein being stable under inert atmosphere at a temperature within the range −40° C. to +40° C.

2. An organometallic liquid polymeric material comprising:

a liquid viscous polymer selected from the group consisting of poly(methylphenylsiloxanes), poly(phenylethers), polymers of styrene, polymers of chloro-substituted styrene, polymers of methyl-substituted styrene, polymers of vinyl naphthalene and polymers of conjugated or cyclic diolefins containing residual unsaturation, said polymer being a liquid viscous polymer at some temperatures within the range −40° C. to +40° C.;

and at least one metal selected from the group consisting of titanium, vanadium niobium, tantalum, monybdenum, chromium, rhodium, palladium, platinum and tungsten;

said metal being chemically bonded to said polymer, in substantial qunatities, in the form of metal atom clusters of from 2–13 metal atoms per cluster;

the weight ratio of metal to polymer in said material being at least about 0.026 parts by weight of metal per part by weight of polymer;

said material and said small-cluster metal form therein being stable at some temperatures within the range −40° C. to +40° C.;

said material having been prepared by vaporizing said metal in an environment of low pressure containing said viscous liquid organic polymer and at a temperaure within the temperature stability range of said organometallic polymer material.

3. The organometallic liquid polymeric material of claim 2 wherein the metal is selected from the group consisting of chromium, titanium, molybdenum and mixtures of two or more of said metals.

4. A process for preparing metallo-organic compounds having chromium metal or chromium and titanium metals in small-cluster form bonded to a liquid polymeric organic material, said liquid organic polymeric material having reactive sites for anchoring of metal atoms or small clusters thereof which are chemical groups selected from aromatic hydrocarbon groups, vinyl and vinylidene groups, internal olefinic unsaturation groups, ring unsaturation functional groups and bridged-ring unsatruated diolefinic groups, which comprises vaporizing said metal or metals into uni-atomic or small cluster form in an environment of low pressure containing said liquid polymeric organic material, at a temperature not greater than about −20° C., causing the vaporized metal to contact and react with reactive sites on said liquid organic polymeric material prior to agglomeration of the metal atoms into bulk metal form, so as to deposit said metal or metals onto the organic polymer in small cluster form, and effectively anchor said metal or metals to the organic polymer in small cluster form, and recovering the metallo-organic polymeric materials so formed from said low pressure environment.

5. A process for preparing metallo-organic compounds having molybdenum metal or molybdenum and titanium metals in small cluster form bonded to a liquid polymeric organic material, said liquid polymeric organic material having reactive sites for anchoring of metal atoms or small clusters thereof which are chemical groups selected from the aromatic hydrocarbon groups, vinyl and vinylidene groups, internal olefinic unsaturation groups, ring unsaturation functional groups and bridged ring unsaturated diolefinic groups, which comprises vaporizing the metal or metals into uni-atomic or small cluster form in an environment of low pressure containing said liquid polymeric organic material, at a temperature not greater than about 27° C., causing the vaporized metal or metals to contact and react with the reactive sites on said liquid organic polymeric material prior to agglomeration of the metal atoms into bulk metal form, so as to deposit said metal or metals onto the organic polymer in small cluster form, and effectively anchor said metal or metals to the organic polymer in small cluster form, the contact with and the reaction between the vaporized metal or metals and said liquid organic polymeric material being continued until at least about 0.026 parts by weight of metal per part by weight of polymer have been deposited thereon, and recovering the metallo-organic polymeric materials so formed from said low pressure environment.

6. A process as claimed in claim 4, wherein the contact with and the reaction between the vaporized metal or metals and the liquid organic polymeric material being continued until at least about 0.026 parts per weight of metal per part by weight of polymer have been deposited thereon.

7. The process of claim 5 or claim 6 wherein the liquid polymeric material is selected in the group consisting of poly(methylphenyl)siloxanes, poly(phenylether), aromatic ester polymers, polymers of styrene, polymers of chloro-substituted styrene, polymers of methyl-substituted styrene, polymers of vinylnaphthalene, copolymers of one or more olefins with a bridged ring diolefin, and polymers of conjugated diolefins which contain residual unsaturation.

8. The process of claim 5 or claim 6 wherein the polymer contains oxygen linkages.

9. The process of claim 5 or claim 6 wherein the polymer is a poly(methylphenyl)siloxane.

10. The process of claim 5 or claim 6 wherein said liquid polymeric organic material is disposed as a thin film supported on a surface, said thin film being rotated about the source of vaporizing metal.

11. The process of claim 5 or claim 6 wherein the liquid polymeric organic material is reacted with the metal vapor at a pressure in the range $10^{-5}$–$10^{-8}$ torr.

12. The material of claim 1 wherein the liquid organic polymer is selected from the group consisting of poly(methylphenylsiloxanes), poly-(phenylether), aromatic ester polymers, polymers of styrene, polymers of chloro-substituted styrene, polymers of methyl-substituted styrene, polymers of vinyl naphthalene, polyvinyl pyridines, copolymers of mono-olenfins with bridged ring diolefins, and polymers of conjugated diolefins containing residual unsaturation.

13. The material of claim 12 wherein the metal is at least one metal selected from the group consisting of titanium, molybdenum and chromium.

14. The material of claim 12 comprising chromium, in metal clusters of two or three atoms, chemically bonded to a liquid poly(methylphenyl) siloxane.

15. The material of claim 12 comprising molybdenum, in metal clusters of two-five atoms, chemically bonded to a liquid poly(methylphenyl) siloxane.

16. The material of claim 12 comprising two metals selected from the group consisting of titanium, molybdenum and chromium, chemically bonded to said polymer in small-cluster form.

* * * * *